United States Patent
Zhang et al.

(10) Patent No.: US 12,430,009 B2
(45) Date of Patent: Sep. 30, 2025

(54) PROMPT METHOD AND APPARATUS BASED ON DOCUMENT SHARING, DEVICE, AND MEDIUM

(71) Applicant: Beijing Zitiao Network Technology Co., Ltd., Beijing (CN)

(72) Inventors: Shuang Zhang, Beijing (CN); Zhiwu Hu, Beijing (CN); Yibin Gao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/396,053

(22) Filed: Dec. 26, 2023

(65) Prior Publication Data

US 2024/0134501 A1   Apr. 25, 2024

Related U.S. Application Data

(63) Continuation of application No. PCT/CN2022/136119, filed on Dec. 2, 2022.

(30) Foreign Application Priority Data

Dec. 30, 2021 (CN) .......................... 202111652721.7

(51) Int. Cl.
*G06F 3/0484* (2022.01)
*G06F 3/0483* (2013.01)
(Continued)

(52) U.S. Cl.
CPC .......... *G06F 3/0484* (2013.01); *G06F 3/0483* (2013.01); *G06F 3/1454* (2013.01); *G06F 9/451* (2018.02); *H04L 12/1895* (2013.01)

(58) Field of Classification Search
CPC .... G06F 3/0484; G06F 3/0483; G06F 3/1454; G06F 9/451; H04L 12/1895
See application file for complete search history.

(56) References Cited

U.S. PATENT DOCUMENTS 9,519,399 B1 * 12/2016 Goodale .............. G06Q 10/101
10,126,927 B1 * 11/2018 Fieldman .............. G06F 3/1454
(Continued)

FOREIGN PATENT DOCUMENTS

| CN | 102999559 A | 3/2013 |
|---|---|---|
| CN | 111651418 A | 9/2020 |

(Continued)

OTHER PUBLICATIONS

International Search Report and Written Opinion received for PCT Patent Application No. PCT/CN2022/136119, mailed on Feb. 22, 2023, 10 pages (2 pages of English Translation and 8 pages of Original Document).

(Continued)

*Primary Examiner* — Matthew Ell
*Assistant Examiner* — Alvaro R Calderon, IV (57) ABSTRACT

Embodiments of the present invention relates to a prompt method and apparatus based on document sharing, a device, and a medium. The method comprises: receiving a display trigger operation of displaying a first document in a browser; sending attribute information of the first document to a server, the server being used for comparing the attribute information of the first document with attribute information of a second document, and sending preset prompt information to the browser when determining, according to a comparison result, that a prompt condition is satisfied, and the second document being a shared document that is actively shared by a meeting client in a real-time meeting interface; and receiving the preset prompt information, and displaying the preset prompt information while displaying the first document in the browser.

20 Claims, 3 Drawing Sheets

(51) Int. Cl.
  *G06F 3/14* (2006.01)
  *G06F 9/451* (2018.01)
  *H04L 12/18* (2006.01)

(56) References Cited

U.S. PATENT DOCUMENTS

| | | | | |
|---|---|---|---|---|
| 2003/0037111 | A1* | 2/2003 | Yoshioka | G06Q 30/0601 |
| | | | | 705/26.1 |
| 2010/0017412 | A1* | 1/2010 | Horowitz | G06F 16/958 |
| | | | | 715/753 |
| 2010/0083135 | A1* | 4/2010 | Zawacki | H04L 12/1822 |
| | | | | 715/753 |
| 2011/0252339 | A1* | 10/2011 | Lemonik | G06F 40/197 |
| | | | | 715/753 |
| 2011/0264745 | A1* | 10/2011 | Ferlitsch | G06Q 10/109 |
| | | | | 709/204 |
| 2012/0151383 | A1* | 6/2012 | Kazan | G06Q 10/101 |
| | | | | 715/753 |
| 2013/0110941 | A1 | 5/2013 | Lewis et al. | |
| 2014/0122522 | A1* | 5/2014 | Ganapathy | G06F 16/951 |
| | | | | 707/769 |
| 2015/0180980 | A1* | 6/2015 | Welinder | H04L 67/06 |
| | | | | 715/758 |
| 2016/0094593 | A1* | 3/2016 | Priya | H04L 65/403 |
| | | | | 709/204 |
| 2016/0259508 | A1* | 9/2016 | Eccleston | G06F 3/0484 |
| 2016/0259656 | A1* | 9/2016 | Sumner | G06F 3/167 |
| 2016/0283451 | A1* | 9/2016 | Young | G06F 16/954 |
| 2017/0083348 | A1* | 3/2017 | Mody | G06F 9/4451 |
| 2017/0083871 | A1* | 3/2017 | Chang | G06F 16/93 |
| 2017/0346877 | A1 | 11/2017 | Lewis et al. | |
| 2019/0073490 | A1* | 3/2019 | Agrawal | G06F 3/1454 |
| 2019/0196781 | A1 | 6/2019 | Yang et al. | |
| 2019/0361580 | A1* | 11/2019 | Dowling | G06F 3/0484 |
| 2021/0014287 | A1 | 1/2021 | Kimball et al. | |
| 2021/0112112 | A1* | 4/2021 | Lopez-Uricoechea | |
| | | | | G06F 16/958 |
| 2021/0149899 | A1* | 5/2021 | Gutiérrez | G06F 16/252 |
| 2021/0181852 | A1* | 6/2021 | Hassan | G06F 3/1454 |
| 2021/0181853 | A1* | 6/2021 | Hassan | G06F 3/04817 |
| 2021/0181938 | A1* | 6/2021 | Hassan | G06F 3/1454 |
| 2021/0183336 | A1* | 6/2021 | Hassan | G06F 3/04886 |
| 2021/0243045 | A1 | 8/2021 | Chen | |
| 2021/0342785 | A1* | 11/2021 | Mann | G06Q 10/06313 |
| 2022/0248187 | A1* | 8/2022 | Reese | H04L 51/046 |
| 2022/0365739 | A1* | 11/2022 | Chang | H04L 65/1073 |
| 2022/0365740 | A1* | 11/2022 | Chang | G06F 3/0488 |
| 2022/0368548 | A1* | 11/2022 | Chang | H04L 67/55 |
| 2022/0368659 | A1* | 11/2022 | Chang | G06F 3/04883 |
| 2022/0368742 | A1* | 11/2022 | Chang | G06F 3/0488 |
| 2022/0374191 | A1* | 11/2022 | Lien | H04N 7/147 |
| 2023/0394223 | A1 | 12/2023 | Zhang et al. | |

FOREIGN PATENT DOCUMENTS

| | | |
|---|---|---|
| CN | 112311754 A | 2/2021 |
| CN | 112328853 A | 2/2021 |
| CN | 112543210 A | 3/2021 |
| CN | 112861472 A | 5/2021 |
| CN | 113395243 A | 9/2021 |
| CN | 113741765 A | 12/2021 |
| CN | 114371896 A | 4/2022 |
| EP | 4156620 B1 | 2/2025 |
| JP | 2009258869 A | 11/2009 |
| JP | 7608675 B1 | 1/2025 |
| WO | 2021127550 A1 | 6/2021 |

OTHER PUBLICATIONS

Search Report received for Chinese Patent Application No. 202111652721.7, mailed on Apr. 7, 2023, 3 pages.

Extended European Search Report for European Application No. 22914022.3, mailed Feb. 21, 2025, 10 Pages.

Decision to Grant a Patent for Japanese Application No. 2024-539594, mailed Nov. 19, 2024, 5 pages.

\* cited by examiner

PROMPT METHOD AND APPARATUS BASED ON DOCUMENT SHARING, DEVICE, AND MEDIUM

CROSS-REFERENCE TO RELATED APPLICATIONS

The present application is based on and claims the benefit of International application No. PCT/CN2022/136119 filed on Dec. 2, 2022, which claims the priority to the Chinese Patent Application No. 202111652721.7 filed on Dec. 30, 2021, and entitled "PROMPT METHOD AND APPARATUS BASED ON DOCUMENT SHARING, DEVICE, AND MEDIUM", the disclosure of which is incorporated by reference herein in its entirety.

TECHNICAL FIELD

The present disclosure relates to the field of information technology, and in particular, to a prompt method and apparatus based on document sharing, a device, and a medium.

BACKGROUND

Due to characteristics of convenience and efficiency of online meetings, more and more users interact via online audio and video meetings.

In the audio and video meetings, documents can be shared among different users, and when one user performs an operation in a shared document, other users can follow it.

SUMMARY

The present disclosure provides a prompt method and apparatus based on document sharing, a device, and a medium.

An embodiment of the present disclosure provides a prompt method based on document sharing, comprising:
  receiving a display trigger operation of displaying a first document in a browser;
  sending attribute information of the first document to a server, the server being configured to compare the attribute information of the first document with attribute information of a second document, and send preset prompt information to the browser when determining, according to a comparison result, that a prompt condition is satisfied, and the second document being a shared document that is actively shared by a meeting client in a real-time meeting interface; and
  receiving the preset prompt information, and displaying the preset prompt information while displaying the first document in the browser.

An embodiment of the present disclosure further provides a prompt method based on document sharing, comprising:
  obtaining attribute information of a first document sent by a browser, the attribute information of the first document being sent by the browser when receiving a display trigger operation of displaying the first document in the browser;
  obtaining attribute information of a second document sent by a meeting client, the attribute information of the second document being sent by the meeting client when actively sharing the second document in a real-time meeting interface;
  comparing the attribute information of the first document with the attribute information of the second document to obtain a comparison result; and
  sending preset prompt information to the browser when determining, according to the comparison result, that a prompt condition is satisfied, so that the browser displays the preset prompt information while displaying the first document.

An embodiment of the present disclosure further provides a prompt apparatus based on document sharing, comprising:
  an operation module configured to receive a display trigger operation of displaying a first document in a browser;
  a sending module configured to send attribute information of the first document to a server, the server being configured to compare the attribute information of the first document with attribute information of a second document, and send preset prompt information to the browser when determining, according to a comparison result, that a prompt condition is satisfied, and the second document being a shared document that is actively shared by a meeting client in a real-time meeting interface; and
  a prompt module configured to receive the preset prompt information, and display the preset prompt information while displaying the first document in the browser.

An embodiment of the present disclosure further provides a prompt apparatus based on document sharing, comprising:
  a first obtaining module configured to obtain attribute information of a first document sent by a browser, the attribute information of the first document being sent by the browser when receiving a display trigger operation of displaying the first document in the browser;
  a second obtaining module configured to obtain attribute information of a second document sent by a meeting client, the attribute information of the second document being sent by the meeting client when actively sharing the second document in a real-time meeting interface;
  a comparing module configured to compare the attribute information of the first document with the attribute information of the second document to obtain a comparison result; and
  a prompt sending module configured to send preset prompt information to the browser when determining, according to the comparison result, that a prompt condition is satisfied, so that the browser displays the preset prompt information while displaying the first document.

An embodiment of the present disclosure further provides an electronic device, comprising: a processor; and a memory configured to store instructions executable by the processor, the processor being configured to read the instructions from the memory and execute the instructions to implement the prompt method based on document sharing according to an embodiment of the present disclosure.

An embodiment of the present disclosure further provides a non-transitory computer-readable storage medium, the storage medium having a computer program stored thereon, and the computer program being configured to perform the prompt method based on document sharing according to an embodiment of the present disclosure.

An embodiment of the present disclosure further provides a computer program, comprising: instructions which, when executed by a processor, cause the processor to perform the prompt method based on document sharing according to an embodiment of the present disclosure.

An embodiment of the present disclosure further provides a computer program product, comprising instructions which, when executed by a processor, cause the processor to perform the prompt method based on document sharing according to an embodiment of the present disclosure.

BRIEF DESCRIPTION OF THE DRAWINGS

The above and other features, advantages, and aspects of the embodiments of the present disclosure will become more apparent in conjunction with the accompanying drawings and with reference to the following detailed description. Throughout the drawings, identical or similar reference numbers refer to identical or similar elements. It should be understood that the drawings are illustrative and that components and elements are not necessarily drawn to scale.

DETAILED DESCRIPTION

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, which are provided for a more complete and thorough understanding of the present disclosure instead. It should be understood that the drawings and the embodiments of the present disclosure are for exemplary purposes only and are not intended to limit the scope of protection of the present disclosure.

It should be understood that various steps recited in the method embodiments of the present disclosure may be performed in a different order, and/or performed in parallel. Moreover, the method embodiments may include additional steps and/or omit performing the illustrated steps. The scope of the present disclosure is not limited in this respect.

The term "include" and variations thereof used herein are intended to be open-ended, i.e., "including but not limited to". The term "based on" is "at least partially based on". The term "one embodiment" means "at least one embodiment"; the term "another embodiment" means "at least one other embodiment"; and the term "some embodiments" means "at least some embodiments". Definitions related to other terms will be given in the following description.

It should be noted that the concepts "first", "second", and the like mentioned in the present disclosure are only used for distinguishing different devices, modules or units, and are not used for limiting the order or interdependence of functions performed by the devices, modules or units.

It should be noted that modifications of "a" or "a plurality" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the embodiments of the present disclosure are for illustrative purposes only, and are not intended to limit the scope of the messages or information.

In the related art, prompt information related to a shared document can be displayed only in a meeting client, and cannot be extended to a scenario where the shared document is displayed in a browser, so that the applicable scenarios are limited and requirements of a user cannot be met.

In order to solve the problem in the related art that the prompt information is limited, the embodiments of the present disclosure provide a prompt method based on document sharing, which is described below with reference to specific embodiments.

Figure 1:
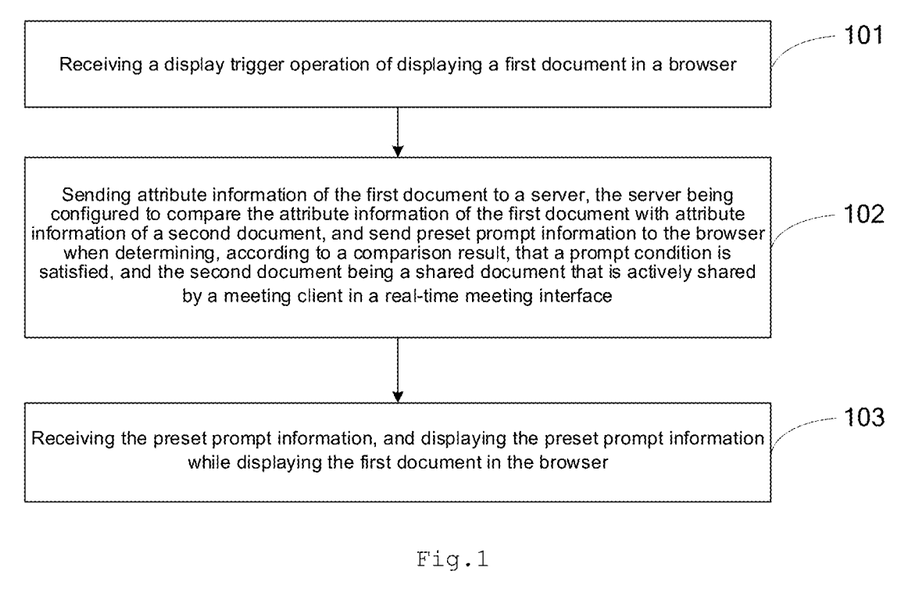
FIG. 1 is a schematic flow diagram of a prompt method based on document sharing according to an embodiment of the present disclosure.

FIG. 1 is a schematic flow diagram of a prompt method based on document sharing according to an embodiment of the present disclosure; the method is executable by a prompt apparatus based on document sharing, wherein the apparatus may be implemented by software and/or hardware, and may be generally integrated in an electronic device. As shown in FIG. 1, the method, which is applied to a terminal device, comprises:

step 101, receiving a display trigger operation of displaying a first document in a browser.

The first document may be understood as a document to be displayed in the browser. For example, the first document has an access address, by entering which in an address bar of the browser, display of the first document in the browser can be realized. In addition, the specific content of the document is not limited, for example, the content of the first document may include text, a table, a schedule, or other formats. The display trigger operation may be a trigger operation on the first document that is realized in the browser, and may include a gesture-controlled operation (such as clicking, long-pressing, and double-clicking), a voice-controlled operation, or an expression-controlled operation, and the like, which is not limited in the embodiment of the present disclosure.

In an embodiment of the present disclosure, the receiving the display trigger operation of displaying the first document in the browser may comprise any of: receiving a display trigger operation of displaying the first document in a page of the browser; receiving, in a state of displaying the first document, a switching operation from a background to a foreground on the browser by a user; and receiving a trigger operation of switching from another page to the page where the first document is located by the user.

When the terminal device receives the display trigger operation of displaying the first document in a page of the browser by the user, the display of the first document may be triggered; or after the terminal device has displayed the first document in the browser and switched to the background, when a trigger operation of switching the browser from the background to the foreground by the user is received, the display of the first document may also be triggered; or after the terminal device has displayed the first document in the browser and switched to another page for display, when a trigger operation of switching from the another page to the page where the first document is located by the user is received, the display of the first document may be triggered. That is, the terminal device may receive a trigger operation of displaying the first document for the first time or once again in the browser by the user.

Step 102, sending attribute information of the first document to a server, the server being configured to compare the attribute information of the first document with attribute information of a second document, and send preset prompt information to the browser when determining, according to a comparison result, that a prompt condition is satisfied, and the second document being a shared document that is actively shared by a meeting client in a real-time meeting interface.

It can be appreciated that if the user actively shares a certain document (e.g., the second document in step 102) in the real-time meeting interface, the document may be presented in real-time meeting interfaces of at least some of other participants participating in the real-time multimedia meeting. On the other hand, if the user does not actively share this document in the real-time meeting interface, a service party providing the real-time meeting service will not share the document presented in the user local with the other participants participating in the real-time multimedia meeting.

Further, in some application scenarios, if the user performs certain user operations (e.g., a browsing operation and/or an editing operation) on the document that is actively shared in the real-time meeting interface, these user operations may be presented in the real-time meeting interfaces of the participants, thereby achieving synchronous content presentation with the user that actively shares the document. Or in other application scenarios, these participants may operate locally the document presented on their real-time meeting interfaces, thereby achieving asynchronous content presentation with the user that actively shares the document.

The attribute information of the first document may be any identification capable of determining the document, and information on whether a user opening the document in the real-time meeting interface and a user opening the document in the browser are the same user. For example, the attribute information may comprise a document identification of the first document and a user identification of a user triggering the first document, i.e., a user identification of the current user performing the display trigger operation on the first document. The second document may be understood as the shared document that the current user as an active sharing party actively shares in the real-time meeting process in the meeting client, wherein the meeting client may be any client capable of performing an online meeting, and the meeting client and the above browser may be installed in the same terminal device. The attribute information of the second document comprises a document identification of the second document and a user identification of a user triggering the second document.

In an embodiment of the present disclosure, a terminal device may, after receiving the display trigger operation of displaying the first document in the browser, send attribute information of the first document to a server, and the server may, after receiving the attribute information of the first document sent by the browser, compare the attribute information of the first document with attribute information of a second document after receiving the attribute information of the second document, and determine that a prompt condition is satisfied if a comparison result is that the first document and the second document have the same document identification and user identification, and may send preset prompt information to the browser.

Step 103, receiving the preset prompt information, and displaying the preset prompt information while displaying the first document in the browser.

Specifically, the browser may receive the preset prompt information sent by the server, and display the preset prompt information while displaying the first document.

The preset prompt information is used for prompting an active sharing state of the second document in the real-time meeting interface of the meeting client; since the determining that the prompting condition is satisfied represents that the first document and the second document are the same, that is, the preset prompt information prompts, while the document is displayed in the browser, that the document is displayed in the meeting client simultaneously and is in the active sharing state, if the current user needs someone else in the meeting to follow, he can return into the meeting client to operate the document.

The displaying of the preset prompt information in the browser can make the current user aware that he is currently operating the document in the browser instead of the document actively shared in the meeting client, so that when the user has the need of a follow-sharing, he can return into the meeting client, which avoids the problem that other participants in the meeting cannot follow when the user is unaware of operating the actively shared document in the browser.

Figure 2:
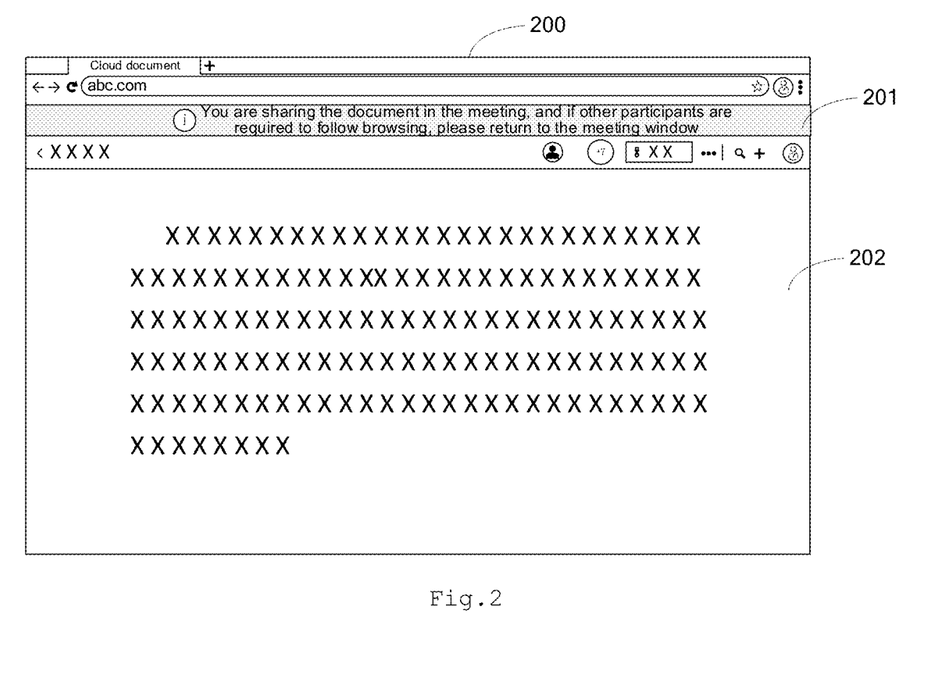
FIG. 2 is a schematic diagram of a prompt of document sharing according to an embodiment of the present disclosure.

Exemplarily, FIG. 2 is a schematic diagram of a prompt of document sharing according to an embodiment of the present disclosure; as shown in FIG. 2, a page 200 in the browser where the first document is located is displayed, where a first document 202 and preset prompt information 201 may be displayed; prompt text in the preset prompt information 201 in the figure may be "you are sharing the document in the meeting, and if other participants are required to follow browsing, please return to the meeting window", which is only an example and is not limited. Some functional controls, such as a sharing control or a search control, may also be presented in the first document 202, which is not limited specifically.

In a prompt solution based on document sharing provided by an embodiment of the present disclosure, a display trigger operation of displaying a first document in a browser is received; attribute information of the first document is sent to a server, the server being configured to compare the attribute information of the first document with attribute information of a second document, and send preset prompt information to the browser when determining, according to a comparison result, that a prompt condition is satisfied, and the second document being a shared document that is actively shared by a meeting client in a real-time meeting interface; and the preset prompt information is received, and the preset prompt information is displayed while the first document is displayed in the browser. Compared with the related art, the technical solution provided by the embodiment of the present disclosure has the following advantages: with the technical solution, when a document is displayed in a browser while the document is actively shared by a user in a meeting client, preset prompt information can be displayed in the browser to prompt the user of the active sharing state of the current document, so that the user returns to the meeting client to perform a browsing operation when other users of the meeting are required to follow browsing, such that the prompt information is extended into the scenario where the shared document is displayed in the browser, and the document browsing experience of the user is improved.

In some embodiments, the prompt method based on document sharing may further comprise: receiving a display trigger operation of displaying the first document in a plurality of pages in the browser, and displaying the preset prompt information while displaying the first document in each page.

After receiving the display trigger operation of displaying the first document in the plurality of pages of the browser by the user, i.e. the user needing simultaneously displaying the first document in the plurality of pages, the terminal device displays the preset prompt information while displaying the first document in each page. Moreover, if the current user displays the above first document in a browser of another terminal device, the above preset prompt information can also be displayed.

In the above solution, if, when the user displays the same document in the plurality of pages in the browser, the preset prompt information is displayed in each page where the document is located, the scenario covered by the prompt information is further enhanced.

In some embodiments, the prompt method based on document sharing may further comprise: in response to a close operation on the preset prompt information by the user, closing the preset prompt information; or, in response to a preset trigger operation by the user, closing the preset prompt information. The preset trigger operation comprises a minimization operation, a close operation or a switching-page operation on the page where the first document is located by the user, the switching-page operation representing an operation of switching from the page where the first document is located to another page.

Specifically, when the terminal device receives the close operation on the preset prompt information displayed in the browser by the user, the preset prompt information may be closed, and the close operation at this time may be understood as a direct and active trigger operation on the preset prompt information by the user; and if the above first document is displayed in the plurality of pages simultaneously, once a close operation on the preset prompt information in one of the pages by the user is received, the preset prompt information of all the pages where the first document is located may be closed. Or, when the user performs the minimization operation, the close operation, or the switching-page operation on the page where the first document is located, the preset prompt information may also be closed, and the close operation at this time may be understood as an indirect trigger operation on the preset prompt information by the user.

In some embodiments, after the closing the preset prompt information in response to the close operation on the preset prompt information by the user, the prompt method based on document sharing may further comprise: if the display trigger operation on the first document is received again within one meeting sharing cycle, not displaying the preset prompt information. The meeting sharing cycle represents one sharing on the second document in the real-time meeting interface.

The meeting sharing cycle may be understood as a period of one sharing on the second document in the real-time meeting interface of the meeting client in the same electronic device by the same user, so that if a second-time sharing on the second document is performed, a new meeting sharing cycle starts.

After the terminal device closes the preset prompt information in response to the close operation on the preset prompt information by the user in the browser, if the display trigger operation on the first document is received again within one meeting sharing cycle, only the first document may be displayed again without displaying the preset prompt information anymore at this time because the user has already actively and directly closed the preset prompt information.

In some embodiments, after the closing the preset prompt information in response to the preset trigger operation by the user, the prompt method based on document sharing may further comprise: if the display trigger operation on the first document is received again, displaying the preset prompt information again.

The browser can, after the closing the preset prompt information in response to the preset trigger operation by the user, display the preset prompt information again when receiving the display trigger operation on the first document again.

In the above solution, whether the preset prompt information is displayed again after being closed may be related to the specific operation by the user, so that when the user directly closes the preset prompt information, which shows that the user has been subjectively aware of the current state of document and does not want to be prompted any more, the preset prompt information is not displayed any more within one meeting sharing cycle even if it is triggered again; and when the user indirectly closes the preset prompt information, the default is that the user wants to be prompted continuously, so that the user is prompted again after it is triggered again. The display and closing of the preset prompt information is more flexible and selectable, better meets the actual requirements of the user, and achieves the prompt effect without influencing the document browsing of the user.

In some embodiments, before the receiving the display trigger operation of displaying the first document in the browser, the prompt method based document sharing may further comprise: receiving a sharing trigger operation of actively sharing the second document in the real-time meeting interface of the meeting client; and in response to the sharing trigger operation, displaying the second document in the real-time meeting interface of the meeting client, and sending address information of the second document to a shared side, so that the shared side displays the second document based on the address information of the second document within one meeting sharing cycle, the meeting client serving as an active sharing side corresponding to the shared side.

The sharing trigger operation may be understood as a trigger operation for actively sharing the second document, wherein the sharing trigger operation may be a gesture-controlled operation (such as clicking, long-pressing, and double-clicking), a voice-controlled operation, or an expression-controlled operation in the real-time meeting interface of the meeting client, which is not limited specifically. The meeting sharing cycle represents one sharing of the second document in the real-time meeting interface.

In an implementation, after the terminal device receives the sharing trigger operation of actively sharing the second document in the meeting client by the user, if what is triggered by the sharing trigger operation is a manner of address sharing, the meeting client as the active sharing side may display the second document in the real-time meeting interface and send address information of the second document to another shared side in the meeting process, and the shared side may obtain the second document by accessing the address information of the second document and also display the second document in the real-time meeting interface, so that the active sharing side and the shared side both display the second document. The above address information of the second document may be a uniform resource locator (URL) of the second document. In this real-time manner, the shared side can switch between a "follow" mode and a "free browse" mode. In the "follow" mode, the real-time meeting interface of the shared side can not only present the content of the second document, but also render the user operation of the active sharing side on the second document in the real-time meeting interface of the shared side, thereby "following" the active sharing side to browse the second document. However, in the "free browse" mode, the real-time meeting interface of the shared side can present the content of the second document, but the user operation of the active sharing side on the second document will not be rendered in the real-time meeting interface of the shared side, and therefore the shared side can browse the second document independently. It can be understood that even in the same real-time multimedia meeting, different shared sides can independently select whether the browsing mode of this side is the "follow" mode or the "free browse" mode.

In another implementation, after the terminal device receives the sharing trigger operation of actively sharing the second document in the meeting client by the user, if what the sharing trigger operation triggers at this time is a manner of screen sharing based on application dimension, the meeting client as the active sharing side may, in the real-time meeting interface, display a real-time screen where the second document is displayed in a first browser, and may send the real-time screen to other shared sides in the meeting process, and the shared side can display the real-time screen, so that the active sharing side and the shared side both display the second document.

In the above solution, the terminal device may actively share the second document in the meeting client in the manner of address sharing or in the manner of screen sharing based on application dimension, so that the active sharing is diversified and better meets customized requirements of the user.

In some embodiments, when what the sharing trigger operation triggers is the manner of screen sharing based on application dimension, the terminal device actively shares the second document; for the real-time screen in which the second document is displayed in the first browser, website information in an address bar of the second document in the real-time screen may be recognized in a manner of optical character recognition (OCR), and the website information of the second document, as the attribute information of the second document, is sent to the server; then, after the terminal device receives a display trigger operation of displaying the first document in a second browser, address information of the first document, as the attribute information of the first document, may be sent to the server; the server may compare the attribute information of the first document with the attribute information of the second document, that is, compare the address information of the first document with the address information of the second document; if the address information of the first document is the same as the address information of the second document, it can be determined that the prompt condition is satisfied, and the preset prompt information is sent to the terminal device, so that the terminal device can receive the preset prompt information, and display the preset prompt information while displaying the first document in the second browser. The meeting client, the first browser and the second browser described above are all provided in the same terminal device.

In the above solution, when a user shares a document displayed in one browser in a meeting client in a manner of screen sharing, preset prompt information can, when the user displays the document in another browser, be displayed in the another browser to prompt the user of an active sharing state of the current document, so that the user returns to the meeting client to perform a browsing operation when other users of the meeting are required to follow browsing, which further enhances the scenario covered by the prompt information, and therefore improves the document browsing experience.

Figure 3:
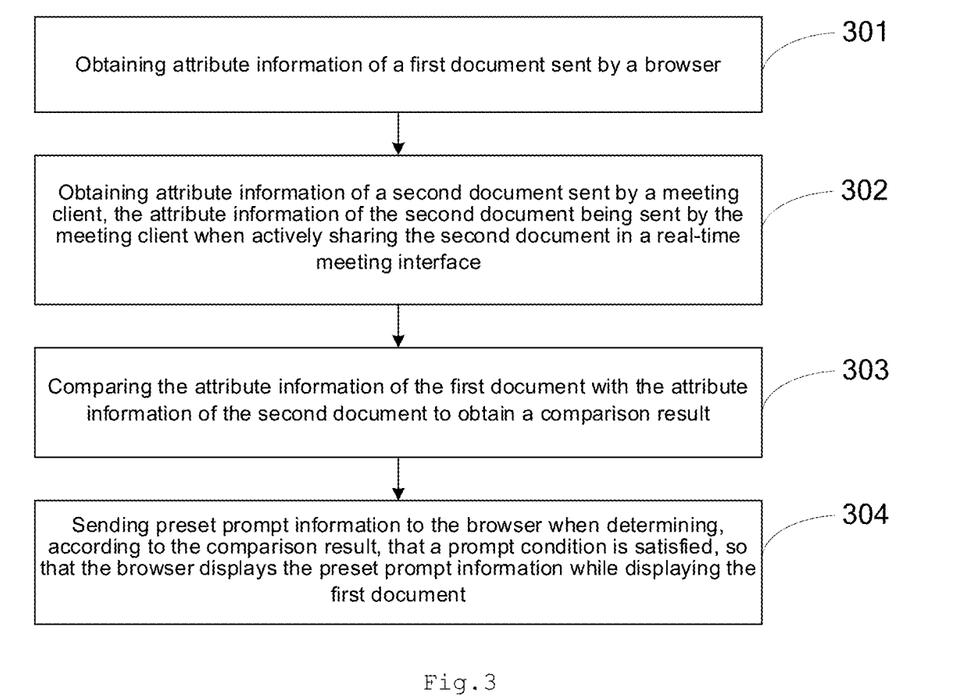
FIG. 3 is a schematic flow diagram of another prompt method based on document sharing according to an embodiment of the present disclosure.

FIG. 3 is a schematic flow diagram of another prompt method based on document sharing according to an embodiment of the present disclosure; this embodiment further optimizes the above prompt method based on document sharing on the basis of the above embodiments. As shown in FIG. 3, the method, which is applied to a server, comprises:

step 301, obtaining attribute information of a first document sent by a browser.

The attribute information of the first document is sent by the browser when receiving a display trigger operation of displaying the first document in the browser.

The server in the embodiment of the present disclosure may be a server corresponding to a meeting client, capable of interacting with the browser. The attribute information of the first document comprises a document identification of the first document and a user identification of a user triggering the first document. In some embodiments, the attribute information of the first document may also be address information of the first document.

In an embodiment of the present disclosure, the server may receive the attribute information of the first document sent by the browser after receiving the display trigger operation on the first document by the user.

Step 302, obtaining attribute information of a second document sent by the meeting client, the attribute information of the second document being sent by the meeting client when actively sharing the second document in a real-time meeting interface.

The second document may be understood as a shared document that is actively shared by a current user as an active sharing party in the real-time meeting process in the meeting client, the meeting client may be any client capable of performing an online meeting, and the meeting client and the above browser may be installed in a same terminal device. The attribute information of the second document comprises a document identification of the second document, and a user identification of a user triggering the second document, as well as a meeting identification of the real-time meeting, and other information. In some embodiments, the attribute information of the second document may also be address information of the second document.

The meeting client may, after actively sharing the second document in the real-time meeting interface, send the attribute information of the second document to the server, and the server may receive the attribute information of the second document. The above meeting client may actively share the second document in a manner of address sharing, or in a manner of screen sharing based on application dimension, which is not limited specifically.

Step 303, comparing the attribute information of the first document with the attribute information of the second document to obtain a comparison result.

In an embodiment of the present disclosure, the comparing the attribute information of the first document with the attribute information of the second document to obtain the comparison result may comprise: comparing the document identification of the first document with the document identification of the second document, and comparing the user identification of the first document with the user identification of the second document to obtain the comparison result.

The server may, after obtaining the attribute information of the first document and the attribute information of the second document, compare the document identification of the first document with the document identification of the second document, and compare the user identification of the first document with the user identification of the second document, wherein the comparison result may include whether the document identifications of the first document and the second document are the same and whether the user identifications thereof are the same, that is, the comparison result may represent whether the first document and the second document are the same document and whether the current users triggering the first document and the second document are the same user.

Step 304, sending preset prompt information to the browser when determining, according to the comparison result, that a prompt condition is satisfied, so that the browser displays the preset prompt information while displaying the first document.

The prompt condition may be understood as a condition for determining whether to send the preset prompt information to the browser. The preset prompt information may be used for prompting that the second document is displayed in the real-time meeting interface of the meeting client and in a follow-sharing mode, and the preset prompt information may be represented in a manner of text, letter, icon, or the like, which is not limited specifically.

In an embodiment of the present disclosure, the determining, according to the comparison result, that the prompt condition is satisfied may comprise: if the comparison result is that the document identification of the first document is the same as the document identification of the second document and the user identification of the first document is the same as the user identification of the second document, determining that the prompt condition is satisfied.

If the document identification of the first document is the same as the document identification of the second document, it may be determined that the first document and the second document are the same document, and then the user identification of the first document may be compared with the user identification of the second document, and if the user identification of the first document is the same as the user identification of the second document, it may be determined that the current users triggering the first document and the second document are the same user, that is, the current user triggers the same document in the browser and the meeting client simultaneously, then it may be determined that the prompt condition is satisfied. Thereafter, the server may send the preset prompt information to the browser, so that the browser displays the preset prompt information while displaying the first document.

In some embodiments, when the meeting client actively shares the second document in the manner of screen sharing based on application dimension, the attribute information of the first document may be address information of the first document, and the attribute information of the second document may be address information of the second document displayed in a first browser that is obtained in a manner of OCR, and the server compares the attribute information of the first document with the attribute information of the second document, that is, compares the address information of the first document with the address information of the second document, if the address information is the same, it can be determined that the current user simultaneously triggers the same document in the second browser and the meeting client, so that it is determined that the prompt condition is satisfied, and therefore the server can send the preset prompt information to the terminal device, and the terminal device can receive the preset prompt information, and display the preset prompt information while displaying the first document in the second browser.

In the prompt solution based on document sharing according to an embodiment of the present disclosure, a server obtains attribute information of a first document sent by a browser, the attribute information of the first document being sent by the browser when receiving a display trigger operation of displaying the first document in the browser; obtains attribute information of a second document sent by a meeting client, the attribute information of the second document being sent by the meeting client when actively sharing the second document in a real-time meeting interface; compares the attribute information of the first document with the attribute information of the second document to obtain a comparison result; and sends preset prompt information to the browser when determining, according to the comparison result, that a prompt condition is satisfied, so that the browser displays the preset prompt information while displaying the first document. With the above technical solution, when a user actively shares a document in the meeting client and simultaneously displays the document in the browser, the server can obtain attribute information of the document in the browser and in the meeting client, respectively, and compare the attribute information, and can send the preset prompt information to the browser if determining, according to the comparison result, that a prompt condition is satisfied, and the browser can display the preset prompt information to prompt the user of the active sharing state of the current document, so that the user returns into the meeting client to perform a browsing operation when other users of a meeting are required to follow browsing, such that the prompt information is extended to the scenario where the shared document is displayed in the browser, and the document browsing experience of the user is improved.

In this solution, when a user actively shares a document in a meeting client and simultaneously opens the same document in a browser, a piece of preset prompt information can be displayed in the browser in a page where the document is located, to prompt the user that the current document is in an active sharing state in the meeting client simultaneously; if the current user needs someone else in a meeting to follow, he can return to the meeting client to operate the document. Moreover, the preset prompt information is triggered for display every time the user jumps from the meeting client to the page in the browser where the document is located, unless the user actively and directly closes the preset prompt information, and at this time, the preset prompt information is not displayed within one meeting sharing cycle anymore. If the browser opens a plurality of same documents simultaneously, the preset prompt information is displayed on all the pages where the same documents are located, and the preset prompt information disappears from all the pages where the same documents are located when disappearing. Moreover, if the browser further includes other prompt information, the preset prompt information has a priority greater than the other prompt information, so that the preset prompt information is displayed preferentially.

For a server, when a document is actively shared in a real-time meeting interface of a meeting client, it may be determined, after a browser receives a display trigger operation on the document, whether a user triggering the document in the browser and a user triggering the document in the meeting client are the same user, and if they are the same user, preset prompt information may be sent to the browser, so that the browser displays the preset prompt information while displaying the document. The prompt information can be extended to the scenario where the shared document is displayed in the browser, so that the document browsing experience of the user is improved.

Figure 4:
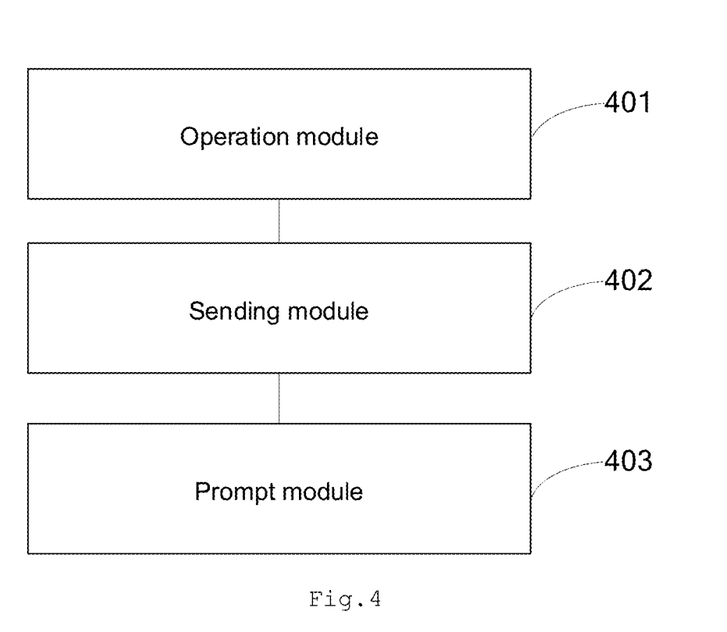
FIG. 4 is a schematic structural diagram of a prompt apparatus based on document sharing according to an embodiment of the present disclosure.

FIG. 4 is a schematic structural diagram of a prompt apparatus based on document sharing according to an embodiment of the present disclosure, wherein the apparatus may be implemented by software and/or hardware, and may be generally integrated in an electronic device. As shown in FIG. 4, the apparatus comprises:

an operation module 401 configured to receive a display trigger operation of displaying a first document in a browser;

a sending module 402 configured to send attribute information of the first document to a server, the server being configured to compare the attribute information of the first document with attribute information of a second document, and send preset prompt information to the browser when determining, according to a comparison result, that a prompt condition is satisfied, and the second document being a shared document that is actively shared by a meeting client in a real-time meeting interface; and a prompt module 403 configured to receive the preset prompt information, and display the preset prompt information while displaying the first document in the browser.

In some embodiments, the operation module 401 is configured to perform any of:

receiving a display trigger operation of displaying the first document in a page of the browser;

receiving, in a state of displaying the first document, a switching operation from a background to a foreground on the browser by a user;

and receiving a trigger operation of switching from another page to the page where the first document is located by the user.

In some embodiments, the apparatus further comprises a multi-prompt module configured to:

receive a display trigger operation of displaying the first document in a plurality of pages in the browser, and display the preset prompt information while displaying the first document in each page. In some embodiments, the apparatus further comprises a closing module configured to:

close the preset prompt information in response to a close operation on the preset prompt information by the user;

or, close the preset prompt information in response to a preset trigger operation by the user.

In some embodiments, the apparatus further comprises a first display module configured to: after closing the preset prompt information in response to the close operation on the preset prompt information by the user, if the display trigger operation on the first document is received again within one meeting sharing cycle, not display the preset prompt information.

In some embodiments, the meeting sharing cycle represents one sharing of the second document in the real-time meeting interface.

In some embodiments, the apparatus further comprises a second display module configured to: after closing the preset prompt information in response to the preset trigger operation by the user, if the display trigger operation on the first document is received again, display the preset prompt information again.

In some embodiments, the preset trigger operation comprises a minimization operation, a close operation, or a switching-page operation on the page where the first document is located by the user, the switching-page operation representing an operation of switching from the page where the first document is located to another page.

In some embodiments, the apparatus further comprises an active sharing module configured to: before the receiving the display trigger operation of displaying the first document in the browser, receive a sharing trigger operation of actively sharing the second document in the real-time meeting interface of the meeting client; and in response to the sharing trigger operation, display the second document in the real-time meeting interface of the meeting client, and send address information of the second document to a shared side, so that the shared side displays the second document based on the address information of the second document within one meeting sharing cycle, the meeting client serving as an active sharing side corresponding to the shared side.

The prompt apparatus based on document sharing provided by the embodiment of the present disclosure can execute the prompt method based on document sharing provided by any embodiment of the present disclosure, and has corresponding functional modules for executing the method and beneficial effects of executing the method.

Figure 5:
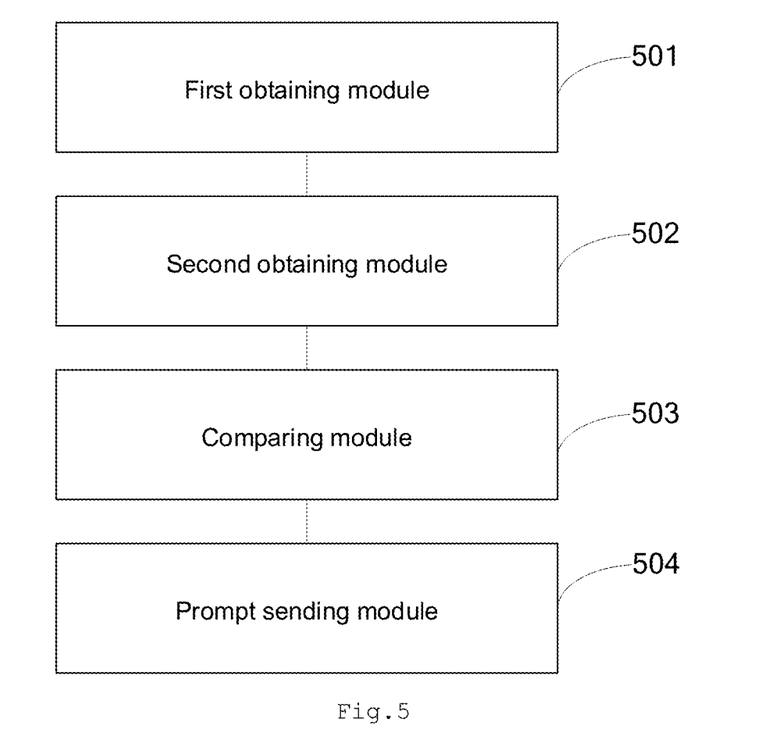
FIG. 5 is a schematic structural diagram of another prompt apparatus based on document sharing according to an embodiment of the present disclosure.

FIG. 5 is a schematic structural diagram of another prompt apparatus based on document sharing according to an embodiment of the present disclosure, wherein the apparatus may be implemented by software and/or hardware, and may be generally integrated in an electronic device. As shown in FIG. 5, the apparatus comprises:

a first obtaining module 501 configured to obtain attribute information of a first document sent by a browser, the attribute information of the first document being sent by the browser when receiving a display trigger operation of displaying the first document in the browser;

a second obtaining module 502 configured to obtain attribute information of a second document sent by a meeting client, the attribute information of the second document being sent by the meeting client when actively sharing the second document in a real-time meeting interface;

a comparing module 503 configured to compare the attribute information of the first document with the attribute information of the second document to obtain a comparison result; and a prompt sending module 504 configured to send preset prompt information to the browser when determining, according to the comparison result, that a prompt condition is satisfied, so that the browser displays the preset prompt information while displaying the first document.

In some embodiments, the attribute information of the first document comprises a document identification of the first document and a user identification of a user triggering the first document, and the attribute information of the second document comprises a document identification of the second document and a user identification of a user triggering the second document.

In some embodiments, the comparing module 503 is specifically configured to:

compare the document identification of the first document with the document identification of the second document, and compare the user identification of the first document with the user identification of the second document, to obtain the comparison result.

In some embodiments, the prompt sending module 504 is configured to:

if the comparison result is that the document identification of the first document is the same as the document identification of the second document and the user identification of the first document is the same as the user identification of the second document, determine that the prompt condition is satisfied.

In some embodiments, the preset prompt information is used for prompting an active sharing state of the second document in the real-time meeting interface of the meeting client.

The prompt apparatus based on document sharing provided by the embodiment of the present disclosure can execute the prompt method based on document sharing provided by any embodiment of the present disclosure, and has corresponding functional modules for executing the method and beneficial effects of executing the method.

An embodiment of the present disclosure further provides a computer program product, comprising a computer program/instructions which, when executed by a processor, implement the prompt method based on document sharing provided by any embodiment of the present disclosure.

Figure 6:
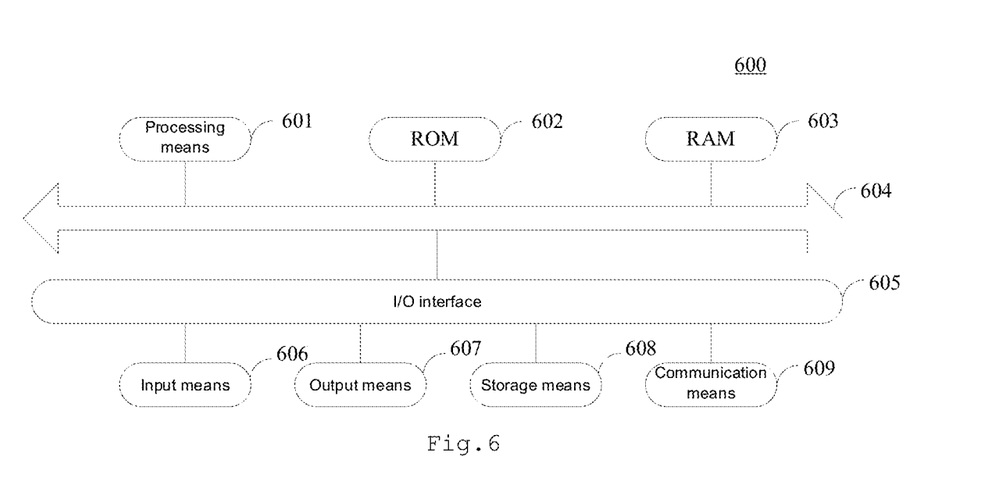
FIG. 6 is a schematic structural diagram of an electronic device according to an embodiment of the present disclosure.

FIG. 6 is a schematic structural diagram of an electronic device according to an embodiment of the present disclosure. Hereinafter, reference is made specifically to FIG. 6, which illustrates a schematic structural diagram suitable for implementing an electronic device 600 in the embodiment of the present disclosure. The electronic device 600 in the embodiment of the present disclosure may include, but is not limited to, a mobile terminal such as a mobile phone, a notebook computer, a digital broadcast receiver, a PDA (personal digital assistant), a PAD (tablet computer), a PMP (portable multimedia player), and a vehicle-mounted terminal (e.g., a vehicle-mounted navigation terminal), and a fixed terminal such as a digital TV, and a desktop computer. The electronic device shown in FIG. 6 is only an example, and should not bring any limitation to the functions and the scope of use of the embodiment of the present disclosure.

As shown in FIG. 6, the electronic device 600 may include a processing means (e.g., central processing unit, graphics processing unit, etc.) 601 that may perform various appropriate actions and processes according to a program stored in a read-only memory (ROM) 602 or a program loaded from a storage means 608 into a random access memory (RAM) 603. In the RAM 603, various programs and data necessary for the operation of the electronic device 600 are also stored. The processing means 601, the ROM 602, and the RAM 603 are connected to each other via a bus 604. An input/output (I/O) interface 605 is also connected to the bus 604.

Generally, the following means may be connected to the I/O interface 605: an input means 606 including, for example, a touch screen, touch pad, keyboard, mouse, camera, microphone, accelerometer, gyroscope, etc.; an output means 607 including, for example, a liquid crystal display (LCD), speaker, vibrator, etc.; the storage means 608 including, for example, a magnetic tape, hard disk, etc.; and a communication means 609. The communication means 609 may allow the electronic device 600 to communicate with other devices wirelessly or by wire to exchange data. While FIG. 6 illustrates the electronic device 600 having various means, it should be understood that not all illustrated means are required to be implemented or provided. More or fewer devices may be alternatively implemented or provided.

In particular, according to the embodiment of the present disclosure, the processes described above with reference to the flow diagrams may be implemented as a computer software program. For example, the embodiment of the present disclosure comprises a computer program product, the computer program product comprising a computer program carried on a non-transitory computer-readable medium, the computer program containing program code for performing the method illustrated by the flow diagrams. In such an embodiment, the computer program may be downloaded from a network via the communication means 609 and installed, or installed from the storage means 608, or installed from the ROM 602. The computer program, when executed by the processing means 601, performs the above functions defined in the prompt method based on document sharing of the embodiment of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. And, in the present disclosure, the computer-readable signal medium may include a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some embodiments, a client and a server may communicate using any currently known or future developed network protocol, such as HTTP (HyperText Transfer Protocol), and may be interconnected with digital data communication (e.g., a communication network) in any form or medium. Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may be exist separately without being assembled into the electronic device.

The above computer-readable medium has one or more programs carried thereon, wherein the above one or more programs, when executed by the electronic device, cause the electronic device to: receive a display trigger operation of displaying a first document in a browser; send attribute information of the first document to a server, the server being configured to compare the attribute information of the first document with attribute information of a second document, and send preset prompt information to the browser when determining, according to a comparison result, that a prompt condition is satisfied, and the second document being a shared document that is actively shared by a meeting client in a real-time meeting interface; and receive the preset prompt information, and display the preset prompt information while displaying the first document in the browser.

Or, the above computer-readable medium has one or more programs carried thereon, wherein the above one or more programs, when executed by the electronic device, cause the electronic device to: obtain attribute information of a first document sent by a browser, the attribute information of the first document being sent by the browser when receiving a display trigger operation of displaying the first document in the browser; obtain attribute information of a second document sent by a meeting client, the attribute information of the second document being sent by the meeting client when actively sharing the second document in a real-time meeting interface; compare the attribute information of the first document with the attribute information of the second document to obtain a comparison result; and send preset prompt information to the browser when determining, according to the comparison result, that a prompt condition is satisfied, so that the browser displays the preset prompt information while displaying the first document.

The present disclosure further provides a computer program product which, when executed by a computer, causes the computer to implement the prompt method based on document sharing according to any method embodiment described above.

The present disclosure further provides a computer program, comprising instructions which, when executed by a processor, cause the processor to implement the prompt method based on document sharing according to any method embodiment described above.

Computer program code for performing the operation of the present disclosure may be written in one or more programming languages or a combination thereof, wherein the above programming language includes but is not limited to an object-oriented programming language such as Java, Smalltalk, and C++, and also includes a conventional procedural programming language, such as the "C" programming language or a similar programming language. The program code may be executed entirely on a user's computer, partly on the user's computer, as a stand-alone software package, partly on the user's computer and partly on a remote computer, or entirely on the remote computer or server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or the blocks may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved unit described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The foregoing merely describes the preferred embodiments of the present disclosure and an explanation of the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

What is claimed is:

1. A prompt method based on document sharing, comprising:
   receiving a display trigger operation of displaying a first document in a browser;
   sending attribute information of the first document to a server, the server being configured to compare the attribute information of the first document with attribute information of a second document, and send preset prompt information to the browser when determining, according to a comparison result, that a prompt condition is satisfied, and the second document being a shared document that is actively shared by a meeting client in a real-time meeting interface; and
   receiving the preset prompt information, and displaying the preset prompt information while displaying the first document in the browser,
   wherein the prompt condition comprises; the first document being the same as the second document actively shared in the real-time meeting interface, and a user triggering the display of the first document in the browser being the same as an active sharer of the second document in the real-time meeting interface;
   and wherein the preset prompt information is configured to prompt that the user is currently operating on a document in the browser, rather than one actively shared in the meeting client.

2. The prompt method according to claim 1, wherein the receiving the display trigger operation of displaying the first document in the browser comprises any of:
   receiving a first display trigger operation of displaying the first document in a page of the browser;
   receiving, in a state of displaying the first document, a switching operation of the user of switching from a background to a foreground on the browser; and
   receiving a trigger operation of the user of switching from another page to a page where the first document is located.

3. The prompt method according to claim 1, wherein the method further comprises:
   receiving a second display trigger operation of displaying the first document in a plurality of pages in the browser, and displaying the preset prompt information while displaying the first document in each page.

4. The prompt method according to claim 1, wherein the method further comprises:
   closing the preset prompt information in response to a close operation on the preset prompt information by the user;
   or, closing the preset prompt information in response to a preset trigger operation by the user.

5. The prompt method according to claim 4, wherein after the closing the preset prompt information in response to the close operation on the preset prompt information by the user, the method further comprises:
   if the display trigger operation on the first document is received again within one meeting sharing cycle, not displaying the preset prompt information.

6. The prompt method according to claim 5, wherein the meeting sharing cycle represents one sharing of the second document in the real-time meeting interface.

7. The prompt method according to claim 4, wherein after the closing the preset prompt information in response to the preset trigger operation by the user, the method further comprises:
   if the display trigger operation on the first document is received again, displaying the preset prompt information again.

8. The prompt method according to claim 4, wherein the preset trigger operation comprises a minimization operation, a page close operation, or a switching-page operation on a page where the first document is located by the user, the switching-page operation representing an operation of switching from the page where the first document is located to another page.

9. The prompt method according to claim 1, wherein before the receiving the display trigger operation of displaying the first document in the browser, the method further comprises:
   receiving a sharing trigger operation of actively sharing the second document in the real-time meeting interface of the meeting client; and
   in response to receiving the sharing trigger operation, displaying the second document in the real-time meeting interface of the meeting client, and sending address information of the second document to a shared side, so that the shared side displays the second document based on the address information of the second document within one meeting sharing cycle, the meeting client serving as an active sharing side corresponding to the shared side.

10. A prompt method based on document sharing, comprising:
    obtaining attribute information of a first document sent by a browser, the attribute information of the first document being sent by the browser in response to receiving a display trigger operation of displaying the first document in the browser;
    obtaining attribute information of a second document sent by a meeting client, the attribute information of the second document being sent by the meeting client in response to actively sharing the second document in a real-time meeting interface;
    comparing the attribute information of the first document with the attribute information of the second document to obtain a comparison result; and
    sending preset prompt information to the browser in response to determining, according to the comparison result, that a prompt condition is satisfied, so that the browser displays the preset prompt information while displaying the first document,
    wherein the prompt condition comprises; the first document being the same as the second document actively shared in the real-time meeting interface, and a user triggering the display of the first document in the browser being the same as an active sharer of the second document in the real-time meeting interface;

and wherein the preset prompt information is configured to prompt that the user is currently operating on a document in the browser, rather than one actively shared in the meeting client.

11. The prompt method according to claim 10, wherein the attribute information of the first document comprises a document identification of the first document and a user identification of a user triggering the first document, and the attribute information of the second document comprises a document identification of the second document and a user identification of a user triggering the second document.

12. The prompt method according to claim 11, wherein the comparing the attribute information of the first document with the attribute information of the second document to obtain the comparison result comprises:
comparing the document identification of the first document with the document identification of the second document, and comparing the user identification of the first document with the user identification of the second document to obtain the comparison result.

13. The prompt method according to claim 11, wherein the determining, according to the comparison result, that the prompting condition is satisfied comprises:
in response to the comparison result indicating that the document identification of the first document is the same as the document identification of the second document and the user identification of the first document is the same as the user identification of the second document, determining that the prompt condition is satisfied.

14. The prompt method according to claim 10, wherein the preset prompt information is used for prompting an active sharing state of the second document in the real-time meeting interface of the meeting client.

15. An electronic device, comprising:
a processor; and
a memory configured to store instructions executable by the processor,
the processor being configured to read the instructions from the memory and execute the instructions to implement steps of:
receiving a display trigger operation of displaying a first document in a browser;
sending attribute information of the first document to a server, the server being configured to compare the attribute information of the first document with attribute information of a second document, and send preset prompt information to the browser when determining, according to a comparison result, that a prompt condition is satisfied, and the second document being a shared document that is actively shared by a meeting client in a real-time meeting interface; and
receiving the preset prompt information, and displaying the preset prompt information while displaying the first document in the browser,
wherein the prompt condition comprises: the first document being the same as the second document actively shared in the real-time meeting interface, and a user triggering the display of the first document in the browser being the same as an active sharer of the second document in the real-time meeting interface;
and wherein the preset prompt information is configured to prompt that the user is currently operating on a document in the browser, rather than one actively shared in the meeting client.

16. The electronic device according to claim 15, wherein the step of receiving the display trigger operation of displaying the first document in the browser comprises any of:
receiving a first display trigger operation of displaying the first document in a page of the browser;
receiving, in a state of displaying the first document, a switching operation of the user of switching from a background to a foreground on the browser; and
receiving a trigger operation of the user of switching from another page to a page where the first document is located.

17. The electronic device according to claim 15, wherein the processor is further configured to execute the instructions to implement steps of:
receiving a second display trigger operation of displaying the first document in a plurality of pages in the browser, and displaying the preset prompt information while displaying the first document in each page.

18. A non-transitory computer-readable storage medium having a computer program stored thereon, for performing the prompt method based on document sharing according to claim 1.

19. An electronic device, comprising:
a processor; and
a memory configured to store instructions executable by the processor,
the processor being configured to read the instructions from the memory and execute the instructions to implement the prompt method based on document sharing according to claim 10.

20. A non-transitory computer-readable storage medium having a computer program stored thereon, for performing the prompt method based on document sharing according to claim 10.

* * * * *